US006636516B1

United States Patent
Yamano

(10) Patent No.: US 6,636,516 B1
(45) Date of Patent: Oct. 21, 2003

(54) QOS-BASED VIRTUAL PRIVATE NETWORK USING ATM-BASED INTERNET VIRTUAL CONNECTIONS

(75) Inventor: Shigeki Yamano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/520,238

(22) Filed: Mar. 7, 2000

(30) Foreign Application Priority Data

Mar. 17, 1999 (JP) .......................................... 11-071285

(51) Int. Cl.[7] .............................................. H04L 12/66
(52) U.S. Cl. .............................. 370/395.52; 370/395.1; 370/401
(58) Field of Search ............................. 370/395.1, 389, 370/401, 395.21, 395.52

(56) References Cited

U.S. PATENT DOCUMENTS

| 5,623,605 A | * | 4/1997 | Keshav et al. .......... 395/200.17 |
| 6,092,113 A | | 7/2000 | Maeshima et al. |
| 6,351,465 B1 | * | 2/2002 | Han .......................... 370/395 |

FOREIGN PATENT DOCUMENTS

| JP | 9-34816 | 2/1997 |
| JP | 10-70566 | 3/1998 |
| JP | 10-247916 | 9/1998 |

OTHER PUBLICATIONS

Luciani et al.; "NBMA Next Hop Resolution Protocol (NHRP)"; RFC2332; IETF; Apr. 1998; 10 sheets.
Dave Koisur, "Building and managing virtual private networks", Wiley Computer Publishing, chapter 7, fig. 7.8.

* cited by examiner

Primary Examiner—Kenneth Vanderpuye
(74) Attorney, Agent, or Firm—Foley & Lardner

(57) ABSTRACT

In a virtual private network (VPN) established over an ATM-over-Internet, a connection setup table has multiple entries, each including a pair of IP addresses identifying source and destination nodes of the VPN, a QoS parameter, an ATM address field, and a virtual connection (VC) field. When a VPN packet is received, a corresponding entry of the table that contains IP addresses of the packet is detected and the table entry is searched for contents of said ATM address and VC fields. If the ATM address field contains no data, an IP header is appended to the VPN packet to formulate an address resolution request packet, which is forwarded to the Internet. An address resolution reply packet is received and a destination ATM address contained therein is stored into the ATM address field. If the ATM address field contains a destination ATM address and the VC field contains no data, a virtual connection is established to the destination ATM address according to the QoS parameter of the corresponding table entry and the connection identifier of the established connection is stored in the VC field. If the VC field contains a connection identifier, the VPN packet is sent over a virtual connection according to the connection identifier.

8 Claims, 10 Drawing Sheets

FIG. 7
ADDRESS TRANSLATION TABLE

| VPN IP ADDRESS (701) | INTERNET IP ADDRESS (702) |
|---|---|
| 10.56.32.0 | 132.207.36.1 |
| 10.56.33.0 | 132.207.37.1 |
| 10.56.34.0 | 132.207.38.1 |
| ------------ | ------------ |

FIG. 4
ROUTING TABLE

| DEST. IP ADDRESS (401) | PREFIX (402) | NEXT HOP IP ADDRESS (403) | OUTGOING INTERFACE (404) |
|---|---|---|---|
| 10.56.32.0 | 24 | 10.56.32.1 | 1 |
| 10.56.33.0 | 24 | 10.56.33.1 | 1 |
| 10.56.34.0 | 24 | 10.56.34.1 | 2 |
| ------------ | ------------ | ------------ | ------------ |

PACKET SORTER

FIG. 6
CONNECTION SETUP TABLE

| 601 | 602 | 603 | 604 | 605 | 606 | 607 | 608 | 609 | 610 | 611 |
|---|---|---|---|---|---|---|---|---|---|---|
| INDEX | DEST. IP ADDRESS | DEST. PREFIX | SOURCE IP ADDRESS | SOURCE PREFIX | DEST. PORT NUMBER | SOURCE PORT NUMBER | QoS | DEST. ATM ADDRESS | VC ID | PARENT INDEX |
| 1 | 10.56.32.0 | 24 | 132.2.36.1 | 24 | — | — | 10M CBR | XXX | 1 | — |
| 2 | 10.56.33.0 | 24 | 132.2.37.1 | 24 | 100 | — | 1M CBR | YYY | 2 | — |
| 3 | 10.56.34.0 | 24 | 132.2.38.1 | 24 | 200 | 50 | 1M CBR | — | — | 1 |
| ------- | ------- | ------- | ------- | ------- | ------- | ------- | ------- | ------- | ------- | ------- |

Columns 602–607: FILTERING DATA

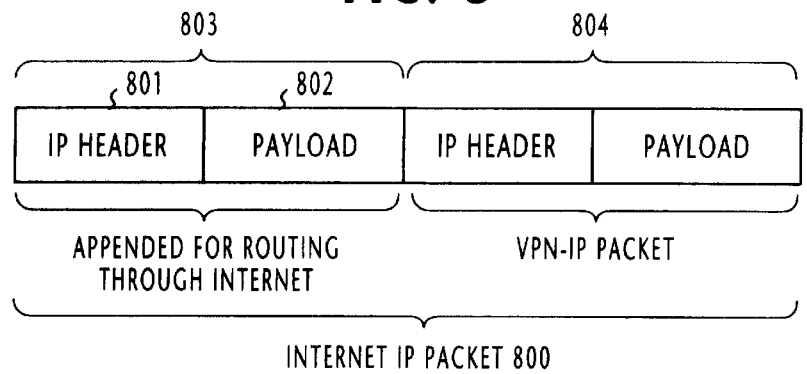
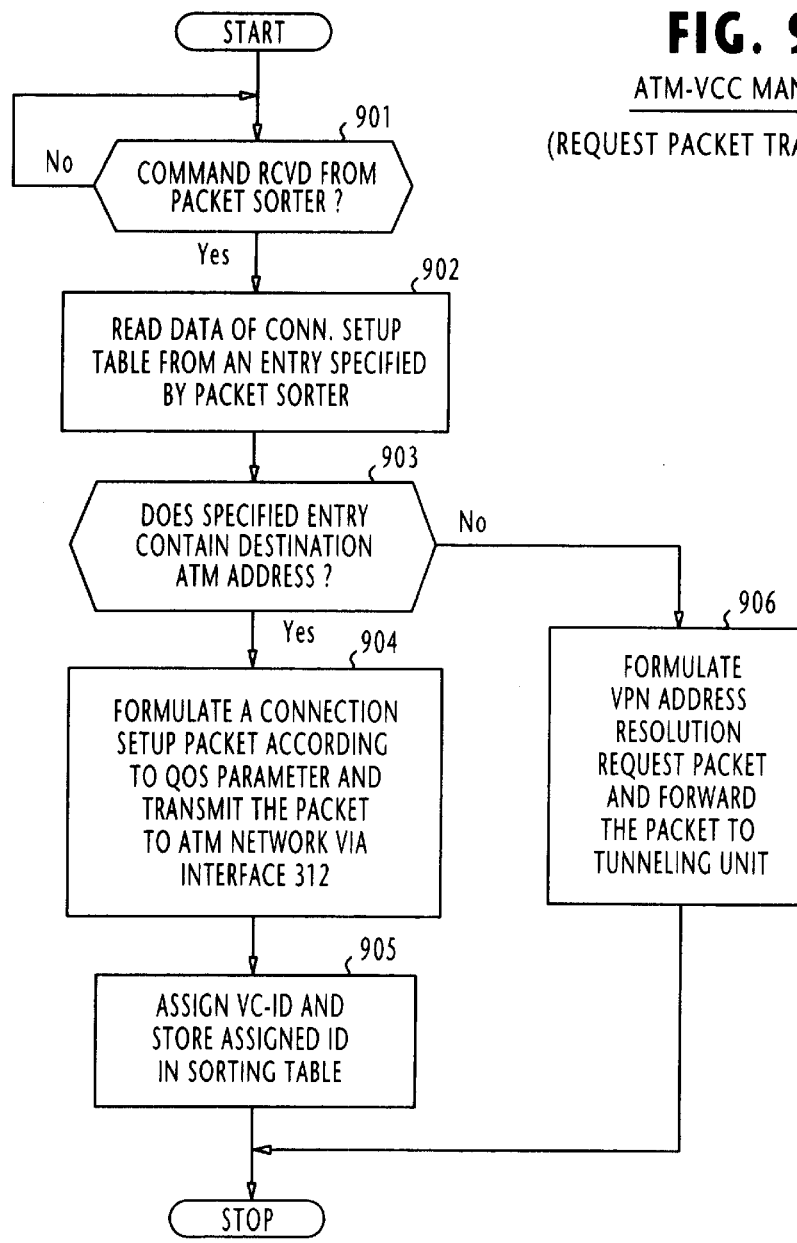

ATM-VCC MANAGER (REQUEST PACKET RECEIVE MODE)

QOS-BASED VIRTUAL PRIVATE NETWORK USING ATM-BASED INTERNET VIRTUAL CONNECTIONS

BACKGROUND OF THE INVENTION

1. Field of the Invention

The present invention relates generally to virtual private networks on the Internet, and more specifically to a virtual private network established through an ATM (asynchronous transfer mode) network that is in turn configured as part of the Internet.

2. Description of the Related Art

The virtual private network (VPN) is one that interconnects a number of local area networks through a public switched packet network such as the Internet for transferring IP (internet protocol) packets between IP nodes identified by IP addresses assigned uniquely within the VPN. Such a virtual private network is described in "Building and Managing Virtual Private Networks", Chapter 7, FIG. 7.8, Dave Kosiur, Wiley Computer Publishing.

The known virtual private network uses a VPN router as shown in FIG. 1. The VPN router has a VPN packet transfer unit 102, a tunneling unit 104 and an internet packet transfer unit 106, all of which are provided between a private network interface 101 associated with its own local area network and a public network interface 108 through which the router accesses the Internet. Both packet transfer units 102 and 106 are respectively associated with routing tables 103 and 107 to search for information necessary for routing an VPN packet to appropriate destination based on destination IP address contained in the packet. Tunneling unit 104 is associated with an address translation table 105 for appending an IP header to a VPN packet received from the VPN packet transfer unit 102 to formulate an IP packet for transmission to the internet via the internet packet transfer unit 106. When the tunneling unit 104 receives an IP packet from the Internet via the internet packet transfer unit 106, it removes an IP header from the packet and forward the remaining VPN packet to the associated LAN via the VPN packet transfer unit 102.

On the other hand, a need may exist to guarantee quality of service (QoS) on the virtual private network. That may not be a problem for a VPN if it is based on a single internet service provider that runs its own network and can segregate its customers' traffic from other Internet traffic. However, if a VPN is based on multiple internet service providers, the QoS parameters used in one internet service provider may also be used in other internet service providers. In such VPNs, it is impossible to uniquely identify the quality of service for each VPN packet to guarantee its performance.

A virtual connection established between source and destination IP addresses in an ATM (asynchronous transfer mode) network may be a solution to guaranteeing quality of service on a VPN. "NBMA Next Hop Resolution Protocol (NHRP)", J. Luciani et al, RFC2332, IETF, April 1998 describes a system that automatically establishes a virtual channel connection as a router-short cut route over an ATM network in a non-broadcast multiple access mode. In this system, a destination ATM address is obtained by consulting an IP routing table to formulate an address resolution request packet. The packet is then forwarded to the Internet and an address resolution reply packet that contains the destination ATM address is received from the Internet. The received destination ATM address is then mapped to an IP address in a virtual connection table. However, routers on the Internet are not provided with a routing table for use with virtual private networks. Therefore, the current automatic VCC setup system is incapable of establishing QoS guaranteed virtual connections.

SUMMARY OF THE INVENTION

It is therefore an object of the present invention to provide a virtual private network in which virtual connections are automatically established through the Internet for different quality of services.

According to the present invention, there is provided a router for building a virtual private network (VPN) through an ATM (asynchronous transfer mode) network configured as part of a public switched packet network. The router comprises a connection setup table having a plurality of entries, each entry including a pair of internet protocol (IP) addresses respectively identifying source and destination nodes of the virtual private network, a quality-of-service parameter, an ATM address field, and a virtual connection (VC) field. Control circuitry is provided for (a) receiving a VPN packet and detecting a corresponding entry in the table that contains IP addresses of the packet and making a search through the corresponding table entry for contents of the ATM address field and the VC field thereof, (b) appending an IP header to the VPN packet, if the ATM address field contains no data, to formulate an address resolution request packet and forwarding the packet to the public switched packet network, (c) receiving an address resolution reply packet therefrom and storing a destination ATM address contained in the reply packet into the ATM address field, and (d) if the ATM address field contains a destination ATM address and the VC field contains no data, establishing a virtual connection to the destination ATM address according to the quality-of-service parameter of the corresponding table entry and storing a connection identifier identifying the established virtual connection in the VC field, and if the VC field contains a connection identifier, forwarding the VPN packet over an established virtual connection identified by the connection identifier.

The control circuitry is further arranged to append an IP header to the VPN packet to formulate an IP packet if the corresponding entry is not detected in the table and forward the IP packet to the public switched packet network.

Preferably, each entry of the connection setup table includes an on/off field, and a time table is provided having a plurality of entries respectively corresponding to the entries of the connection setup table for mapping time schedule data. Triggering circuitry is provided for monitoring the time schedule data of each entry of the time table and storing an indication in the on/off field of each entry of the connection setup table according to the monitored data of the corresponding entry of the time table. The control circuitry is arranged to enable or disable contents of each entry of the connection setup table depending on the indication stored in the on/off field of the entry.

BRIEF DESCRIPTION OF THE DRAWINGS

The present invention will be described in further detail with reference to the accompanying drawings, in which:

FIG. 4 is an illustration of a routing table either associated with the VPN packet transfer unit or the internet packet transfer unit of FIG. 3;

FIG. 6 is an illustration of the connection setup table of FIG. 3;

FIG. 7 is an illustration of the address translation table of FIG. 3;

FIG. 8 is an illustration of the packet format of an internet IP packet;

FIG. 9 is a flowchart of the operation of the ATM-VCC manager of FIG. 3 during a request packet transmit mode;

DETAILED DESCRIPTION

Figure 1:
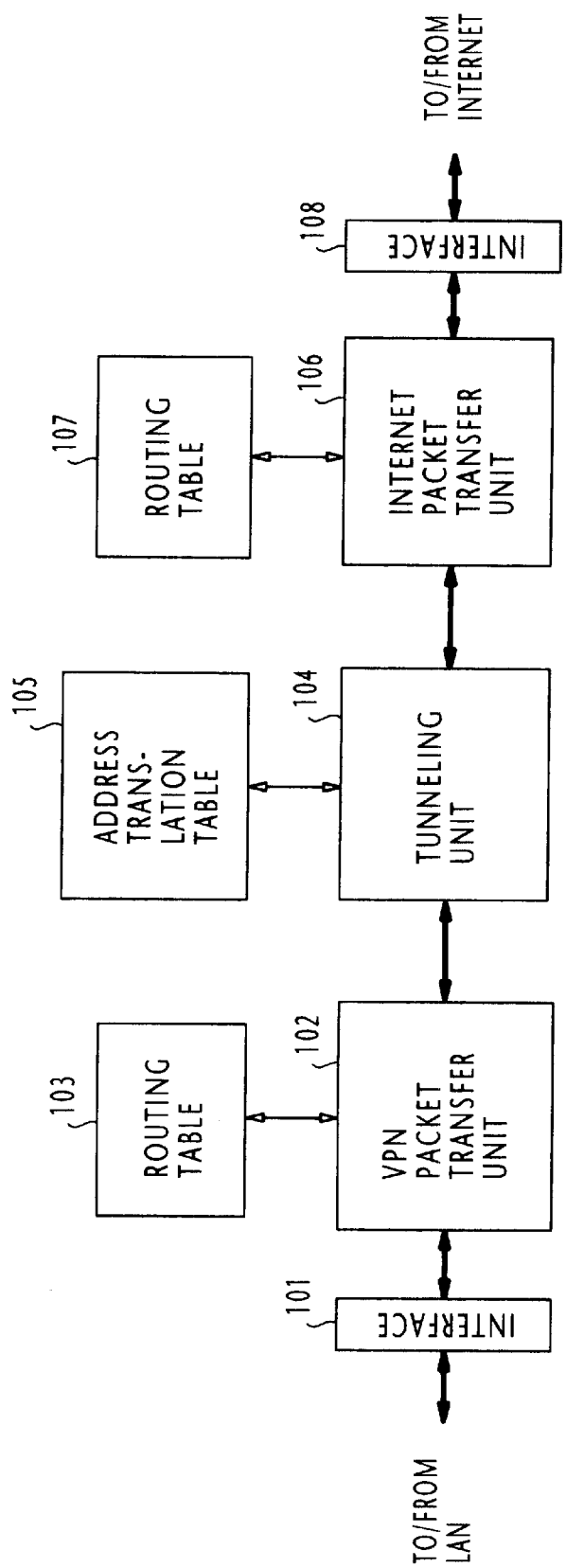
FIG. 1 is a block diagram of a prior art router used to establish a virtual private network (VPN) in a public switched network such as the internet.
Figure 2:
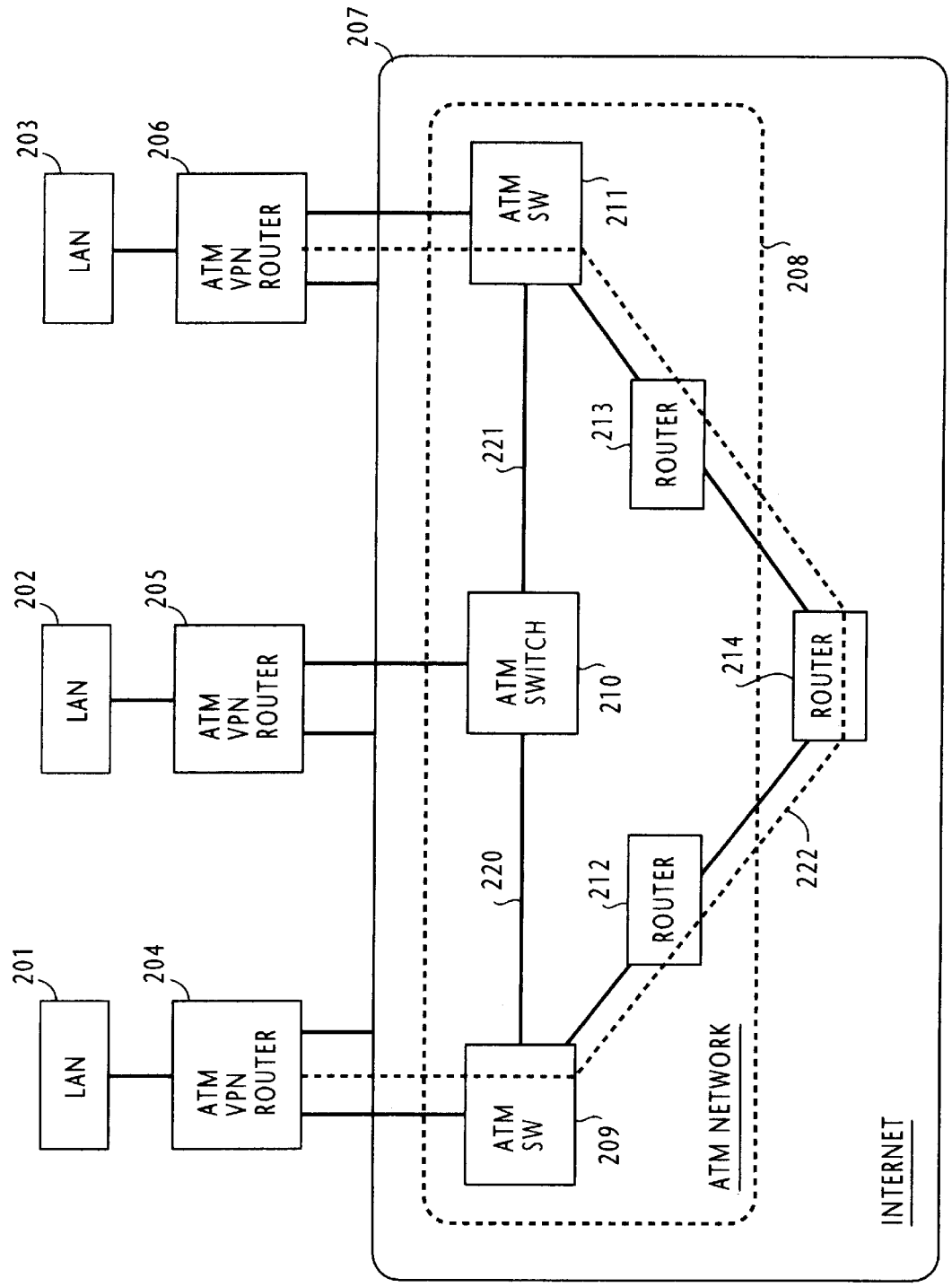
FIG. 2 is a block diagram illustrating an ATM-based virtual private network established in the internet according to the present invention.

Referring now to FIG. 2, there is shown an ATM (asynchronous transfer mode)-based virtual private network (VPN) of the present invention established in a public network such as the internet for interconnecting a plurality of local area networks (LANs) 201 through 203. LANs 201, 202 and 203 are respectively attached to ATM-VPN routers 204, 205 and 206 which are connected to a public network such as the internet 207 and to an ATM network 208 which forms part of the internet 207.

The ATM network 208 is comprised of ATM switches 209, 210 and 211 respectively connected to the ATM-VPN routers 204, 205 and 206. ATM switches 209 and 210 are interconnected by a communication link 220 and ATM switches 210 and 211 are interconnected by a communication link 221. Each ATM-VPN router is identified by an assigned ATM address that is used for establishing ATM virtual channel connections through the ATM network 208 over the physical links 220 and 221. Routers 212 and 213 are respectively connected to the ATM switches 209 and 211 interconnected by a router 214 which forms part of the internet 207. An ATM virtual channel connection 222 may also be established between ATM-VPN routers 204 and 206 via ATM switch 209, routers 212, 214, 213 and ATM switch 211. Note that in each of the local area networks, IP (internet protocol) nodes are identified by an IP address unique to the virtual private network.

Figure 3:
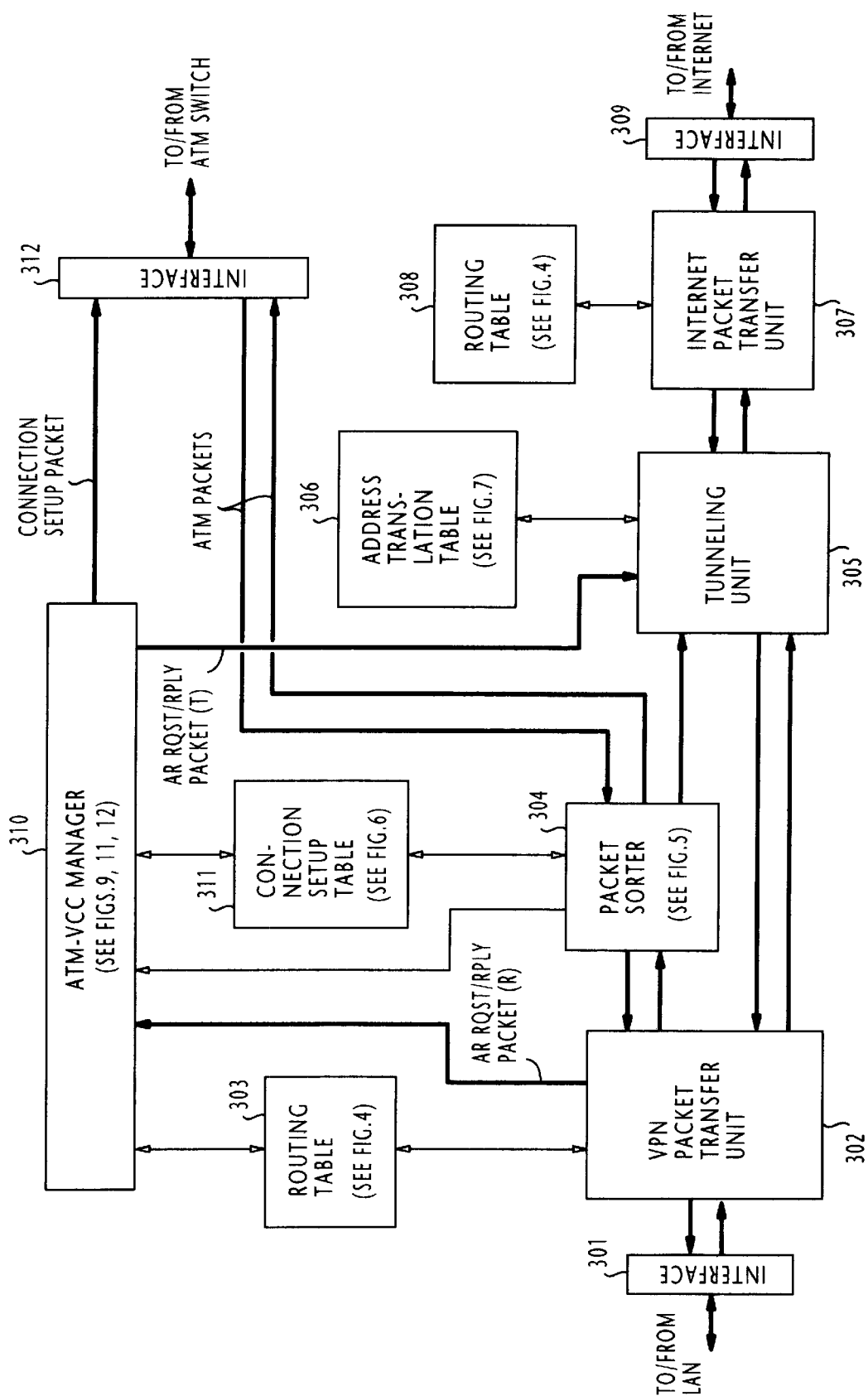
FIG. 3 is a block diagram of an ATM-VPN router of FIG. 2.

As shown in detail in FIG. 3, each ATM-VPN router is connected through a private network interface 301 to the associated LAN, and has access to the internet 207 through a public network interface 309 and to the ATM network 208 through an ATM network interface 312. Between the private network interface 301 and the public network interface 309 are provided a VPN packet transfer unit 302, a packet sorter 304, a tunneling unit 305 and an internet packet transfer unit 307.

Packet transfer units 302 and 307 are respectively connected to routing tables 303 and 308, and the tunneling unit 305 is connected to an address translation table 306. Further, the packet sorter 304 is connected to a connection setup table 311. Further provided is an ATM-VCC manager 310 whose functions include the resolution of ATM addresses and the establishment of ATM virtual channel connections (VCCs). ATM-VCC manager 310 is associated with various units including packet transfer unit 302, routing table 303, packet sorter 304, connection setup table 311, tunneling unit 305, address translation table 306 and the ATM network interface 312.

Packet sorter 304 is also directly connected to the ATM network interface 312 for transmission and reception of IP packets over the ATM network 208. In that regard, the ATM network interface 312 provides the functions of converting an outbound packet to ATM cells and converting received ATM cells to an inbound packet.

An IP packet received from the associated LAN is a VPN IP packet that comprises an IP header containing a destination IP address, a source IP address, a destination port number and a source port number and a payload field containing the payload signal of the packet.

When the VPN packet transfer unit 302 receives a VPN IP packet from the associated LAN via the interface 301, it reads the destination IP address contained in the packet and consults the routing table 303.

As shown in FIG. 4, the routing table 303 is partitioned into a plurality of rows of entry, each being subdivided into a plurality of fields 401, 402, 403 and 404 respectively storing a destination IP address, a prefix length, a next hop IP address and an outgoing interface identifier. The higher significant bits of the destination IP address of the received packet which are specified by the prefix length field 402 are compared to the corresponding higher significant bits stored in each of the destination IP address fields 401 of the routing table for coincidence.

If a coincidence is detected in one of the entries, the VPN packet transfer unit 302 reads data from the next hop IP address field 403 and outgoing interface field 404 of that entry to determine whether or not the field 404 indicates that the outgoing interface identifier given in field 404 identifies a private network interface.

If the outgoing interface field 404 indicates that the outgoing interface is a private network interface, it is determined that the destination is an IP node of the associated LAN and the received packet is sent back to the associated LAN. Otherwise, the VPN packet transfer unit 302 forwards the received packet and the read next hop IP address to the packet sorter 304.

Figure 5:
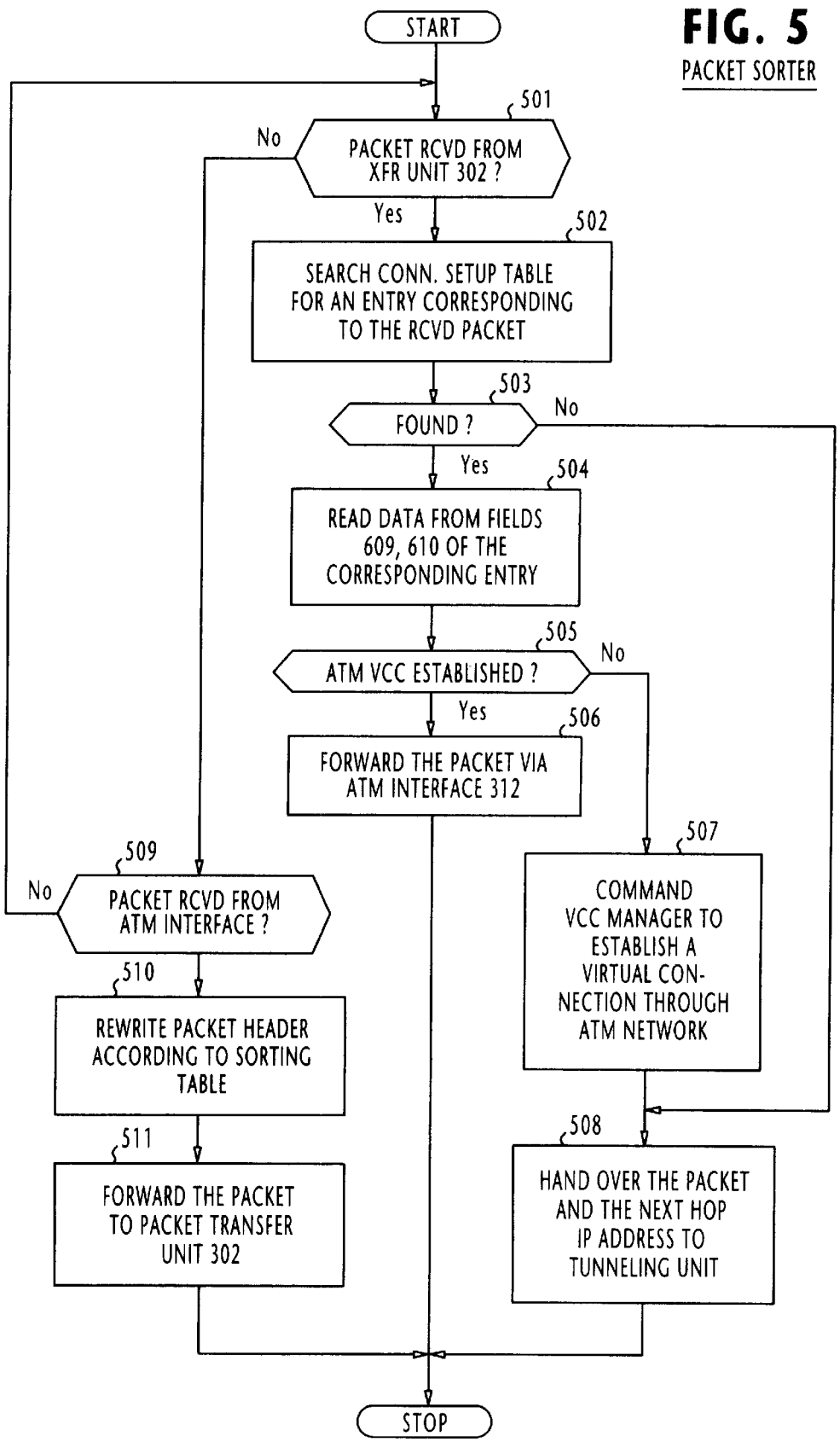
FIG. 5 is a flowchart of the operation of the packet sorter of FIG. 3.

As shown in the flowchart of FIG. 5, the packet sorter 304 responds, at step 501, to the packet from the VPN packet transfer unit 302 by reading the destination and source IP addresses and the destination and source port numbers from the received packet and making a search through the connection setup table 311 for an entry that contains the same IP addresses and the same port numbers as those contained in the received packet (step 502), and proceeds to decision step 503.

As shown in FIG. 6, the connection setup table 311 is partitioned into a plurality of entries each being subdivided into a plurality of fields 601 through 611. In each entry, the field 601 contains an index number that identifies the entry and the fields 602 through 607 contain a destination IP address, a destination prefix length, a source IP address, a source IP address, a source prefix length, a destination port number, and a source port number, respectively. The destination and source port numbers are given in the fields 606 and 607 only when the upper layer of a received IP packet uses the TCP (transmission control protocol) or UDP (user datagram protocol) to identify the traffic category of the packet.

The field 608 of each entry contains QoS (quality of service) parameters for guaranteeing the transmission quality of that entry, and the field 609 contains the ATM address of a destination ATM-VPN router which will be used when an ATM virtual channel connection is set up in the ATM network. If an ATM virtual channel connection is established, the identity of the established VCC is stored in the VC-ID field 610. A parent index number is given in the index field 611 of an entry to indicate the index number of an entry that shares the same ATM-VCC with that entry.

Data given in the fields 601 through 607 are used as "filtering data" for making a decision on whether or not an IP packet should be forwarded to an ATM virtual channel connection. For example, packets that correspond to the entry of index number 2 are only those that contain a 24-bit destination IP address 10.56.33, a 24-bit source IP address 132.2.37 and a destination port number 100. Therefore, if the IP addresses and the port numbers of the received packet coincide with the filtering data, the packet sorter 304 proceeds to read the QoS parameters (10M CBR), the destination ATM address (YYY) and the VC identifier (2) from their respective fields 608, 609 and 610.

If an index number is given in the parent index field 611 of a corresponding entry, data stored in the fields 608, 609 and 610 of an entry having the same parent index number are read, instead of those in the fields 608, 609, 610 of that corresponding entry. Therefore, if the entry of index number 3 is referenced by a received packet, data in the fields 608, 609 and 610 of the entry of index number 1 are read from the connection setup table into the packet sorter.

Returning to FIG. 5, if there is a corresponding entry in the connection setup table 311 whose filtering data correspond to those of the received packet, the decision at step 503 is affirmative and the packet sorter 304 proceeds to step 504 to read data from the destination ATM address field 609 and VC identifier field 610 of the corresponding entry and checks to see if an ATM-VCC is established (step 505).

If a VC identifier is given in the field 610 of the corresponding entry, it is determined that an ATM-VCC has already been established and the routine proceeds from step 505 to step 506 to forward the packet to the ATM network via the interface 312 using the identifier given in the VC-ID field 610 of the connection setup table, before proceeding to the end of the routine. Such a packet propagates over the established virtual connection through the ATM network and arrives at a destination ATM-VPN router, where it is received through the interface 312 by the packet sorter 304 at step 509. In response, the packet sorter 304 proceeds to step 510 to look up the connection setup table 311 and rewrites the header of the ATM packet according to the filtering data of the corresponding entry. At step 511, it sends the packet to the VPN packet transfer unit 302, which in turn uses the routing table 303 for routing the packet. In this way, quality guaranteed virtual connections can be established in a virtual private network according to the desired quality-of-service parameters.

If no virtual connection identifier is given in the field 610, it is determined, at step 505, that no virtual connection is established for that entry and the routine proceeds to step 507 to supply the index field number of the entry to the ATM-VCC manager 310 and a command signal to request it to establish a virtual connection through the ATM network, and then hands over the received packet along with the next hop IP address obtained from the routing table 303 to the tunneling unit 305 before terminating the routine. Tunneling unit 305 has a responsibility to transmit the packet through the internet.

If there is no entry in the connection setup table whose filtering data corresponds to the received packet, the packet sorter 304 determines that the destination of the packet is through the internet and proceeds from decision step 505 to step 508.

In response to the receipt of a packet and the next hop IP address of the packet from the packet sorter 304, the tunneling unit 305 obtains a destination IP address and a source IP address from the address translation table 306 in which VPN IP addresses are mapped to corresponding internet IP addresses as shown in FIG. 7. More specifically, the destination IP address is obtained from the next hop IP address and the source IP address is obtained from the ATM-VPN router's own IP address. As shown in FIG. 8, these IP addresses are written in an IP header 801 and ancillary internet data is inserted in a payload field 802 to form a header portion 803 and encapsulated with the VPN IP packet 804 in an internet IP packet 800, which is then forwarded to the internet packet transfer unit 307.

In response, the internet packet transfer unit 307 consults the routing table 308, which is similar in configuration to that shown in FIG. 4, for a next hop IP address and an outgoing interface identifier corresponding to the destination IP address contained in the IP header 801 of the internet IP packet 800. The internet IP packet is forwarded to the internet via the interface specified by the outgoing interface identifier, so that the packet is transmitted to a router identified by the next hop IP address.

FIG. 9 is a flowchart illustrating the operation of the ATM-VCC manager 310 that is initiated in response to the command signal supplied from the packet sorter 304 when it has executed step 507 (FIG. 5). The operation of manager 310 begins with step 901 by reading data from an entry of the connection setup table 311 that is specified by the index number supplied from the packet sorter (step 902). Control proceeds to step 903 to check to see if the destination ATM address field 609 of the specified entry contains a destination ATM address. Since it was determined by the packet sorter 304 (at step 505) that the virtual connection is not set up in the ATM network, an affirmative decision will be made at step 903 if an address is already given in the destination ATM address field 609. This affirmative decision indicates that no virtual connection identifier (VC-ID) is given in the VC-ID field 610. Hence it is necessary to set up a virtual channel connection through the ATM network to the destination address that is given in the destination ATM address field 609. To this end, the ATMI-VCC manager 310 proceeds to step 904 to formulate a connection setup packet according to the quality-of-service parameters given in the QoS field 608 and the address field 609 of the specified entry and transmits the packet to the ATM network via the interface 312. At step 905, the manager 310 assigns a virtual connection identifier (VC-ID) to the established connection and stores the assigned identifier in the VC-ID field 610 of the specified entry before terminating the routine.

Figure 10:
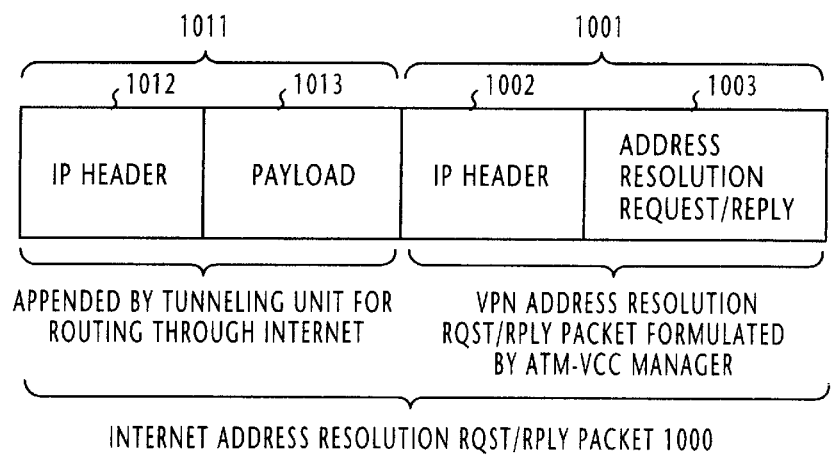
FIG. 10 is an illustration of the packet format of an internet address resolution request/reply packet.

If no destination ATM address is given in the address field 609 of the specified entry of the connection setup table 311, it is necessary to initiate an address resolution process. Thus, control proceeds from step 903 to step 906 to formulate a VPN address resolution request packet 1001 (see FIG. 10). The packet 1001 contains an IP header 1002 that copies the data in the destination IP address field 602 of the specified entry. This IP header is followed by a payload field 1003 in which an address resolution request indication is given. The VPN address resolution request packet 1001 is then forwarded to the tunneling unit 305 before terminating the routine of FIG. 9.

In response to the receipt of address resolution request packet 1001, the tunneling unit 305 looks up the address translation table 306 to detect a destination internet IP address corresponding to the VPN IP address of the packet 1001 and formulates an IP header 1012 with the detected internet IP address and a source internet IP address (i.e., the address of the ATM-VPN router). IP header 1012 is followed by a payload field 1013 that encapsulates ancillary data for routing the packet through the internet. IP header 1012 and the payload field 1013 are assembled into an internet header 1011 and appended to the VPN address resolution request packet 1001 to produce an internet address resolution request packet 1000. Then, the internet address resolution request packet 1000 is forwarded to the internet packet transfer unit 307.

In response to the packet 1000, the internet packet transfer unit 307 makes a search through the routing table 308 for a next hop IP address and an outgoing interface identifier corresponding to the destination IP address contained in the IP header 1012 of the packet 1000. The address resolution request packet 1000 is forwarded to the internet via the interface specified by the outgoing interface identifier and sent to another ATM-VPN router.

IP packets arriving from the internet via the interface 309 are received by the internet packet transfer unit 307. When the internet packet transfer unit 307 receives an IP packet from the internet, it makes a search through the routing table 308 for a next hop IP address and an outgoing interface identifier corresponding to the destination IP address contained in the received packet. If the detected outgoing interface identifier indicates a public network interface, the internet packet transfer unit 307 forwards the received packet to the internet via the specified interface. Otherwise, the received packet is directed from the transfer unit 307 to the tunneling unit 305, which removes the header portion 803 or 1011 from the packet depending on the packet type and forwards the packet 804 or 1001 to the VPN packet transfer unit 302.

If the packet received from the tunneling unit is a VPN-IP packet 804, the VPN packet transfer unit 302 makes a search through the routing table 303 for a next hop IP address and an outgoing interface identifier corresponding to the destination IP address contained in the received packet and forwards the received packet to the associated LAN or back to the tunneling unit 305 depending on the contents of the data retrieved from the routing table 303.

Figure 11:
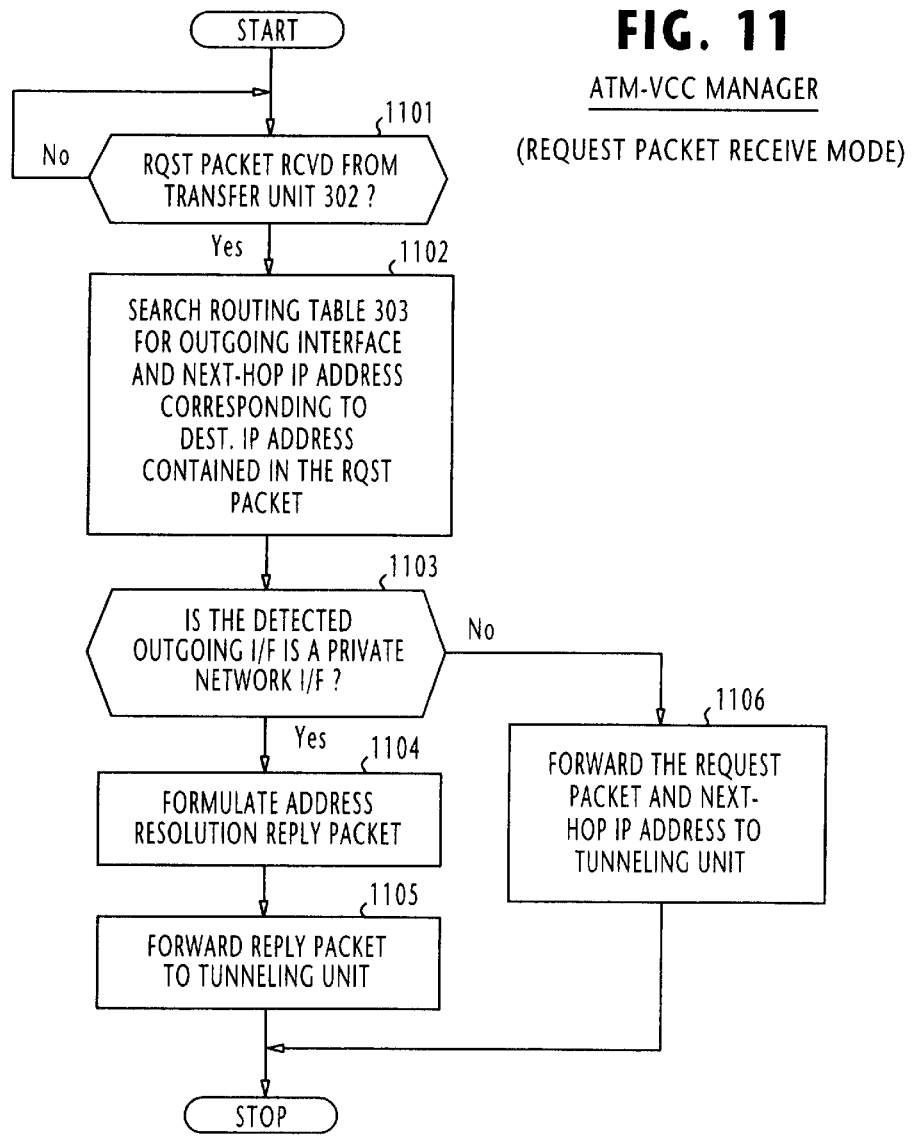
FIG. 11 is a flowchart of the operation of the ATM-VCC manager during a request packet receive mode.

If the packet received from the tunneling unit is a VPN address resolution request packet 1001, the VPN packet transfer unit 302 forwards it to the ATM-VCC manager 310, which responds to this packet for operating according to the flowchart of FIG. 11.

When a VPN address resolution request packet is received from the VPN packet transfer unit 302 at step 1101, the manager 310 proceeds to step 1102 to search through the routing table 303 for a next hop IP address and an outgoing interface identifier (OG/IF) corresponding to the destination IP address of the request packet.

At decision step 1103, the manager 310 checks to see if the outgoing interface specified by the identifier OG/IF is a private network interface. If the decision is affirmative, it is determined that the ATM-VPN router is targeted and control proceeds to step 1104 to formulate a VPN address resolution reply packet 1001 (see FIG. 10) by encapsulating the ATM address of the targeted ATM-VPN router as a source address and the ATM address of the requesting ATM-VPN router as a destination address. The address resolution reply packet is then forwarded to the tunneling unit 305 (step 1105).

In response, the tunneling unit 305 formulates an internet address resolution reply packet (similar in format to the request packet 1000) by appending a header portion 1011 to the received packet 1001 and forwards the packet to the internet via the internet packet transfer unit 307 according to the information retrieved from the routing table 308, so that the reply packet is destined for the requesting ATM-VPN router.

If the decision at step 1103 is negative, it is determined that the ATM-VPN router is not the target router and control proceeds to step 1106 to forward the received address resolution request packet along with the next hop IP address obtained from the routing table 303 to the tunneling unit 305, where it is re-encapsulated in an internet address resolution request packet and transmitted to the internet via the packet transfer unit 307. Following the execution of step 1105 or 1106, the routine of FIG. 11 is terminated.

When the internet address resolution reply packet 1000 is received by the requesting ATM-VPN router, it is processed through the internet packet transfer unit 307, the tunneling unit 305 and the VPN packet transfer unit 302 in a manner similar to the processes discussed above, so that the header portion 1011 of the packet is removed and the remainder of the packet is received by the ATM-VCC manager 310 as a VPN address resolution reply packet 1001.

Figure 12:
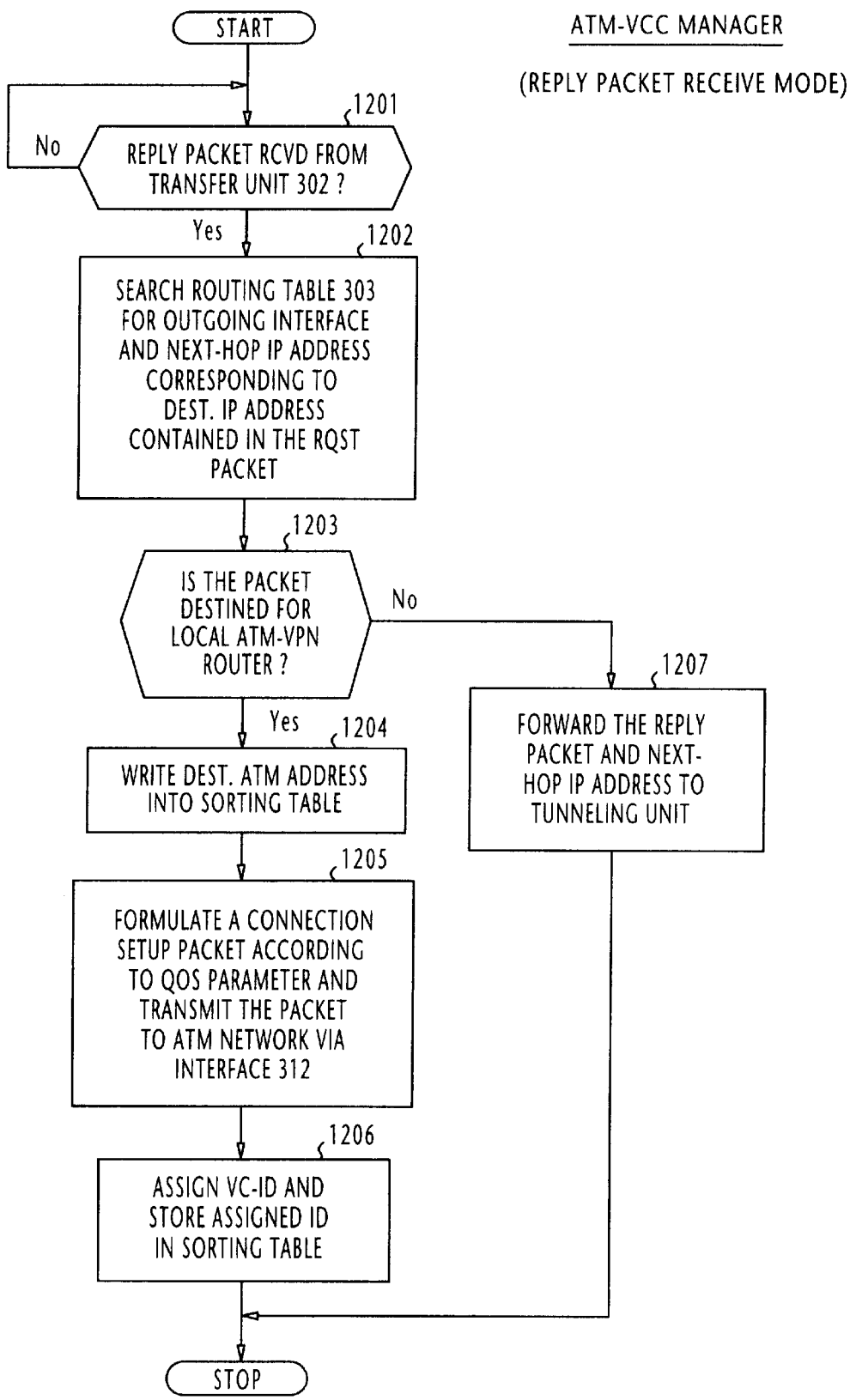
FIG. 12 is a flowchart of the operation of the ATM-VCC manager during a reply packet receive mode.

FIG. 12 illustrates the operation of the ATM-VCC manager 310 when it receives the VPN address resolution request packet 1001 from the packet transfer unit 302.

When a VPN address resolution request packet 1001 is received from the VPN packet transfer unit 302 at step 1201, the manager 310 proceeds to step 1202 to search through the routing table 303 for a next hop IP address and an outgoing interface identifier (OG/IF) corresponding to the destination IP address of the request packet.

At decision step 1203, the manager 310 checks to see if the received reply packet is destined for its own ATM-VPN router by examining the identifier OG/IF. If the decision is affirmative, control proceeds to step 1204 to read the destination ATM address from the packet and write it into the destination. ATM address field 609 of the specified entry of connection setup table 311. Control proceeds to step 1205 to formulate a connection setup packet according to the data contained in the QoS field 608 and the address field 609 of the specified entry and transmits the packet to the ATM network via the interface 312. At step 905, the manager 310 assigns a virtual connection identifier (VC-ID) to the established connection and stores the assigned identifier in the VC-ID field 610 of the specified entry.

If the decision at step 1203 is negative, control proceeds to step 1207 to forward the received address resolution reply packet along with the next hop IP address obtained from the routing table 303 (as in the case of the received address resolution request packet) to the tunneling unit 305, where it is re-encapsulated in an internet address resolution reply packet and transmitted to the internet via the packet transfer unit 307. Following the execution of step 1206 or 1207, the routine of FIG. 12 is terminated.

Figure 13:
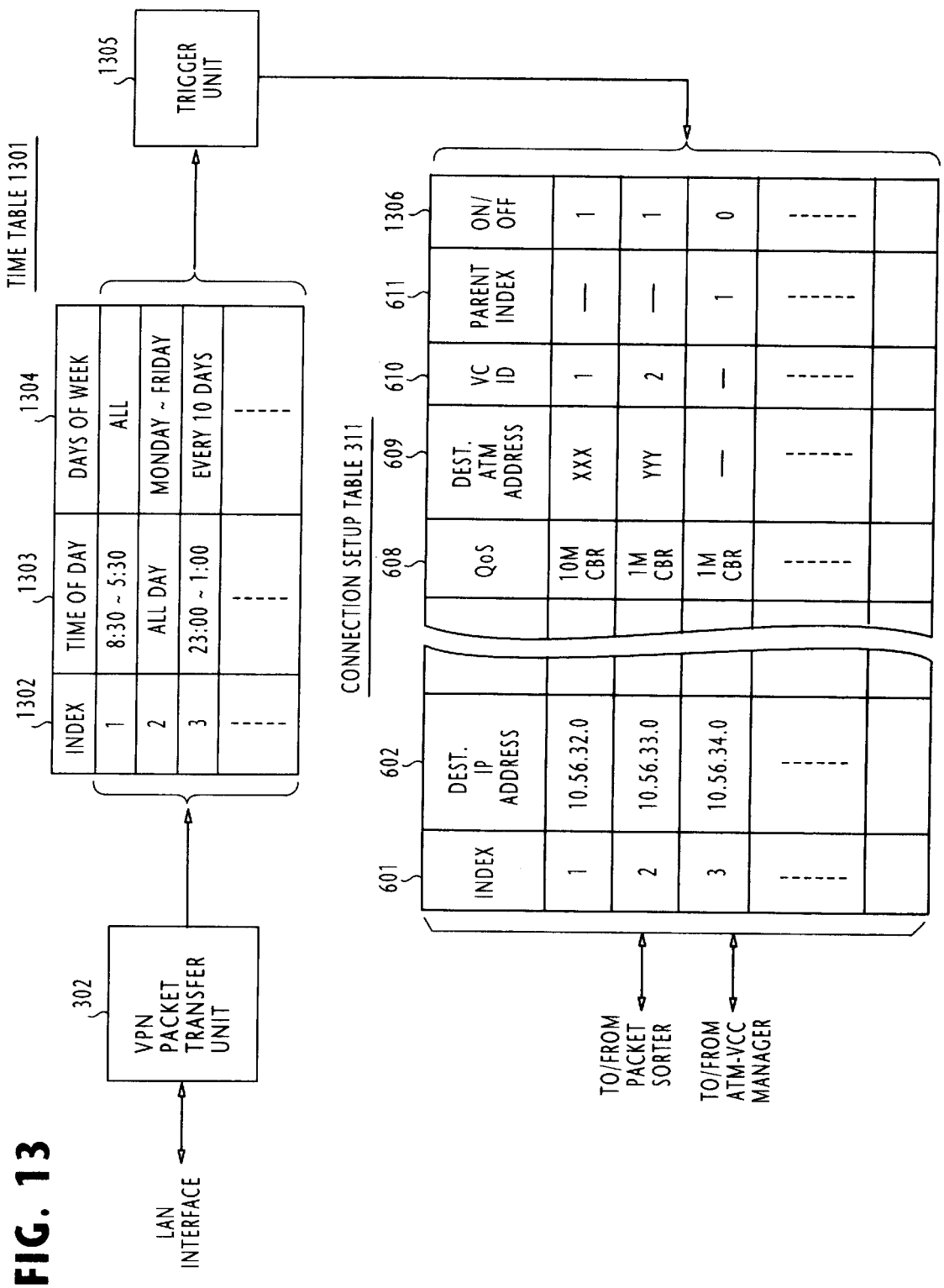
FIG. 13 is a block diagram of a modified embodiment of the present invention.

FIG. 13 is a block diagram of a modified embodiment of the present invention. In this modification, the ATM-VPN router further includes a time table 1301 having a plurality of entries each being subdivided into a plurality of fields 1302, 1303 and 1304 for storing an index number, time-of-day data, and days-of-week data, respectively. Time schedule data of the time table 1301 are generated in a network management center, not shown, encapsulated in a management packet and transmitted to the VPN packet transfer unit 302 where the time schedule data are extracted and stored in the time table 1301. A trigger unit 1305 is connected to the time table 1301 to monitor the time schedule data to detect when the current time of day is equal to the stored data in any entry to supply an output signal to the connection setup table 311. Each entry of the connection setup table 311 is provided with an on/off field 1306. According to the output signal of the trigger circuit 1305, a binary 1 is stored in the on/off field 1306 of a specified entry of the connection setup table 311 to indicate that the data of the specified entry are enabled, or a binary 0 is stored in the on/off field to indicate that the data of that entry are disabled. As long as a binary 1 is stored in an entry of the connection setup table, an ATM virtual channel connection is established in the ATM network for that entry. When one entry of the connection setup table is disabled, the virtual connection of this entry in the ATM network is cleared down to free up the network resource for other uses and the identifier in the corresponding VC-ID field 611 is erased. As a result, common network resources can be assigned to network users according to their working hours and economically used.

What is claimed is:

1. A router for building a virtual private network (VPN) through an ATM (asynchronous transfer mode) network configured as part of a public switched packet network, the router comprising:

a connection setup table having a plurality of entries, each entry including a pair of internet protocol (IP) addresses respectively identifying source and destination nodes of the virtual private network, a quality-of-service parameter, an ATM address field, and a virtual connection (VC) field; and control circuitry for (a) receiving a VPN packet and detecting a corresponding entry in said table that contains IP addresses of the packet and making a search through the corresponding table entry for contents of the ATM address field and the VC field thereof, (b) appending an IP header to the VPN packet, if said ATM address field contains no data, to formulate an address resolution request packet and forwarding the packet to said public switched packet network, (c) receiving an address resolution reply packet therefrom and storing a destination ATM address contained in the reply packet into said ATM address field, and (d) if said ATM address field contains a destination ATM address and said VC field contains no data, establishing a virtual connection to the destination ATM address according to the quality-of-service parameter of the corresponding table entry and storing a connection identifier identifying the established virtual connection in said VC field, and if said VC field contains a connection identifier, forwarding said VPN packet over an established virtual connection identified by the connection identifier.

2. A router as claimed in claim 1, wherein said control circuitry is arranged to append an IP header to said VPN packet to formulate an IP packet if said corresponding entry is not detected in said table and forward the IP packet to said public switched packet network.

3. A router as claimed in claim 1, wherein each entry of said connection setup table includes an on/off field, further comprising:

a time table having a plurality of entries respectively corresponding to the entries of said connection setup table for mapping time schedule data; and triggering circuitry for monitoring the time schedule data of each entry of the time table and storing an indication in the on/off field of each entry of the connection setup table according to the monitored data of the corresponding entry of the time table, wherein said control circuitry is arranged to enable or disable contents of each entry of the connection setup table depending on the indication stored in the on/off field of the entry.

4. A router as claimed in claim 3, wherein said control circuitry is arranged to receive a time schedule signal and alter said time table according to the received time schedule signal.

5. A method of building a virtual private network (VPN) through an ATM (asynchronous transfer mode) network configured as part of a public switched packet network, said virtual private network including a connection setup table having a plurality of entries, each entry including a pair of internet protocol (IP) addresses respectively identifying source and destination nodes of the virtual private network, a quality-of-service parameter, an ATM address field, and a virtual connection (VC) field, the method comprising the steps of:

a) receiving a VPN packet and detecting a corresponding entry in said table including IP addresses of the packet and making a search through the corresponding table entry for contents of said ATM address and VC fields;

b) if said ATM address field contains no data, appending an IP header to the VPN packet to formulate an address resolution request packet and forwarding the packet to said public switched packet network;

c) receiving an address resolution reply packet and storing a destination ATM address contained therein into said ATM address field; and d) if said ATM address field contains a destination ATM address and said VC field contains no data, establishing a virtual connection to the destination ATM address according to the quality-of-service parameter of the corresponding table entry and storing a connection identifier identifying the established virtual connection in said VC field, and if said VC field contains a connection identifier, forwarding said VPN packet over a virtual connection according to the connection identifier.

6. A method as claimed in claim 5, wherein the step (a) comprises the steps of appending an IP header to said VPN packet to formulate an IP packet if said corresponding entry is not detected in said connection setup table and forwarding the IP packet to said public switched packet network.

7. A method as claimed in claim 5, wherein each entry of said connection setup table includes an on/off field, and wherein said virtual private network further includes a time table having a plurality of entries respectively corresponding to the entries of said connection setup table for mapping time schedule data, further comprising the steps of:

monitoring the time schedule data of each entry of the time table and storing an indication in the on/off field of each entry of the connection setup table according to the monitored data of the corresponding entry of the time table; and enabling or disabling contents of each entry of the connection setup table depending on the indication stored in the on/off field of the entry.

8. A method as claimed in claim 7, further comprising the steps of receiving a time schedule signal and altering said time table according to the received time schedule signal.

* * * * *